United States Patent [19]
Ishigaki et al.

[11] Patent Number: 5,836,568
[45] Date of Patent: Nov. 17, 1998

[54] HIGH-VACUUM VALVE

[75] Inventors: Tsuneo Ishigaki; Keiichi Shibuya, both of Yawara-mura, Japan

[73] Assignee: SMC Corporation, Japan

[21] Appl. No.: 870,795

[22] Filed: Jun. 6, 1997

[30]   Foreign Application Priority Data

Jun. 14, 1996 [JP] Japan .................................. 8-174418

[51] Int. Cl.[6] .................................................. F16K 17/36
[52] U.S. Cl. .......................................... 251/148; 251/368
[58] Field of Search ..................................... 251/148, 368

[56]           References Cited

U.S. PATENT DOCUMENTS

| 2,571,539 | 10/1951 | Christie ................................... | 251/148 |
| 4,121,980 | 10/1978 | Gohausen et al. .................... | 204/35 N |
| 5,605,174 | 2/1997 | Schlecht et al. ..................... | 251/148 X |

FOREIGN PATENT DOCUMENTS 6139187  11/1986  Japan .

*Primary Examiner*—Kevin Lee
*Attorney, Agent, or Firm*—Baker & Botts, L.L.P.

[57]           ABSTRACT

A high-vacuum valve in which a seal portion of the inner wall of an annular space for interposing a metallic annular gasket is subjected to an anodic oxidation coating treatment other than the sulfuric acid anodic oxidation coating treatment to enhance the compression strength of the seal portion and to prevent the seal portion from being damaged, deformed and sticking to the metallic annular gasket. The high-vacuum valve has a plurality of ports communicated with a valve chamber in a valve body through respective tubular portions. A valve seat is formed in a flow path connecting the valve chamber and one of the tubular portions. The flow path is closed by bringing a valve element into contact with the valve seat, and the flow path is opened by separating the valve element from the valve seat. An annular space for interposing a metallic annular gasket is formed at an end portion of a tubular portion of an aluminum alloy that forms a port, and a seal portion is formed on an inner wall that forms the annular space. The seal portion or the whole of the valve body is subjected to an oxalic acid anodic oxidation coating treatment, thereby enhancing the compression strength of the seal portion and preventing the seal portion from being damaged, deformed and sticking to the metallic annular gasket.

2 Claims, 2 Drawing Sheets

HIGH-VACUUM VALVE

BACKGROUND OF THE INVENTION

The present invention relates to a high-vacuum valve having a seal portion formed in an annular space portion for interposing a gasket at an end of a tubular portion that forms a port.

A conventional high-vacuum valve has a flange joint for connecting piping, in which hermetic sealing is effected by interposing an O-ring of fluorine-contained rubber in an annular space formed between a flange of an aluminum alloy on the high-vacuum valve side and a flange of an aluminum alloy provided on the pipe side to face the valve-side flange. However, in a case where an O-ring of fluorine-contained rubber is used at room temperatures of from 20° C. to 30° C., the rate of gas released from the O-ring is about $1\times10^{-8}$ (Torr l/sec/cm$^2$), and the rate of helium gas permeability of the O-ring is about $1\times10^{-7}$ (Torr l/sec/cm$^2$). Moreover, it has been confirmed that under heated conditions (at 80° C. to 150° C.) or during baking (at 100° C. to 150° C.) of the system, the rate of gas permeability is from one to two orders of magnitude higher than that at room temperatures. Thus, in a case where an O-ring of fluorine-contained rubber is interposed between the atmospheric air and a vacuum system, a clean vacuum cannot be obtained because of the release of gas from the O-ring and the permeation of atmospheric components into the vacuum system. If atmospheric components, e.g. $H_2O$, $O_2$, and sulfur oxides, enter semiconductor manufacturing facilities, even in a trace amount, serious damage will be done to the deposition of semiconductor film.

Under the above-described circumstances, it was proposed to interpose, as shown in FIG. 2a, an annular gasket 4 of a soft pure aluminum alloy (hardness: about Hv 40) in an annular space 3 between flanges 2A and 2B of a hard aluminum alloy (hardness: Hv 120) (see, for example Japanese Utility Model Application Post-Examination Publication No. 61-39187). When the annular gasket of such an aluminum alloy is used at room temperatures of from 20° C. to 30° C., the rate of gas released from the annular gasket is $1\times10^{-12}$ (Torr l/sec/cm$^2$), and the rate of permeability to helium gas is not higher than about $1\times10^{-13}$ (Torr l/sec/cm$^2$). In FIG. 2a, a bolt 5 is inserted into bolt holes in the flanges 2A and 2B and engaged with a nut 6, and the aluminum alloy annular gasket is compressed strongly to effect sealing. It has been known that the arrangement shown in FIG. 2a enables the rate of leakage to be readily reduced to $1\times10^{-10}$ (Torr l/sec) or less. It is clear that the aluminum alloy annular gasket is much superior to the O-ring of fluorine-contained rubber.

As shown in FIGS. 2a and 2b, knife edges 2a are formed on the inner walls of the flanges 2A and 2B that define the annular space 3. The knife edges 2a are capable of coming into close contact with the annular gasket 4 of a soft pure aluminum alloy by cutting into the annular gasket 4. Each knife edge 2a has a surface subjected to mirror grinding. The mirror-ground surface has a hard surface layer formed from a titanium carbide (TiC), titanium nitride (TiN) or chromium nitride (CrN) by ion plating process. The formation of a hard surface layer on each knife edge 2a makes it possible to prevent damage to the seal portion and sticking of the seal portion to the annular gasket 4. On the other hand, the surface of the pure aluminum alloy annular gasket 4 is subjected to a process to remove a layer caused to change in properties by oxidation and roll marks produced by rolling. The annular gasket 4 is clamped between the two knife edges 2a. Thus, hermeticity is kept by the distal ends 2a' of the knife edges 2a. Moreover, the surface portions 2a" of the knife edges 2a are also placed in contact with the annular gasket 4 to keep hermeticity at the joint between the surfaces.

A high-vacuum valve has two ports for connecting piping. The center axes of the ports intersect each other at right angles. To perform hardening process by ion plating for the knife edge of a tubular portion that forms a port, plating must be carried out twice, and thus much labor is required. The hardness of titanium nitride (TiN) is about Hv 1,800, and the hardness of chromium nitride (CrN) is about Hv 1,400. These hardness values are in excess of the hardness (Hv 400 to 500) necessary for the knife edges of a high-vacuum valve.

Anodic oxidation coating treatments (anodized aluminum coating treatment) are conceivable as surface treatments by which a hardness of Hv 400 to 500 is obtained. We tried the sulfuric acid anodic oxidation coating treatment, which has become industrially most widespread of various anodic oxidation coating treatments. In an arrangement such as that shown in FIG. 2a, when each flange including the knife edge is subjected to sulfuric acid anodic oxidation coating treatment in place of the ion plating process, the sulfuric acid anodic oxidation coating is cracked during both the use (continuous) under heating at 120° C. or more and baking for a short period of time. Accordingly, the resulting product is proved defective by a helium leakage test. Moreover, in the process of the sulfuric acid anodic oxidation coating treatment in a sulfuric acid electrolytic bath, a sulfuric acid anodic oxidation coating grows in the form of columns inwardly from the surface, resulting in a porous layer where columnar cells stand close together. Consequently, helium passes through the sulfuric acid anodic oxidation coating (i.e. slow leak occurs). Therefore, this coating method cannot be put to practical use.

SUMMARY OF THE INVENTION

An object of the present invention is to provide a high-vacuum valve wherein a seal portion of the inner wall of an annular space for interposing a metallic annular gasket is subjected to an anodic oxidation coating treatment other than the sulfuric acid anodic oxidation coating treatment to enhance the compression strength of the seal portion and to prevent the seal portion from being damaged, deformed and sticking to the metallic annular gasket.

To attain the above-described object, the present invention provides a high-vacuum valve of the type wherein a plurality of ports are communicated with a valve chamber in a valve body through respective tubular portions, and a valve seat is formed in a flow path connecting the valve chamber and one of the tubular portions, and wherein the flow path is closed by bringing a valve element into contact with the valve seat, and the flow path is opened by separating the valve element from the valve seat. An annular space for interposing a metallic annular gasket is formed at an end portion of a tubular portion of an aluminum alloy that forms a port, and a seal portion is formed on an inner wall that forms the annular space. The seal portion or the whole of the valve body is subjected to an oxalic acid anodic oxidation coating treatment, thereby enhancing the compression strength of the seal portion and preventing the seal portion from being damaged, deformed and sticking to the metallic annular gasket.

The high-vacuum valve according to the present invention may be arranged such that an annular projection is formed on the outer periphery of the end portion of the tubular portion, and an annular metal fitting is movably fitted on the outer peripheral surface of the annular projection, and that a C-shaped retaining ring fitted in an engagement groove on the inner periphery of the annular metal fitting is disposed to abut on a ring seat provided on the rear side of the annular projection, and the annular space is formed by the inner peripheral surface of the distal end portion of the annular metal fitting and the end portion of the tubular portion, and further that the metallic annular gasket is made of a soft aluminum material, and the seal portion has a knife edge.

According to the present invention, the seal portion formed on the inner wall that forms an annular space for interposing a metallic annular gasket is subjected to an oxalic acid anodic oxidation coating treatment. Therefore, the compression strength of the seal portion is enhanced, and thus the seal portion is prevented from being damaged, deformed and sticking to the metallic annular gasket. A hardness (Hv 400 to 500) necessary for the seal portion (knife edge) of the high-vacuum valve can be obtained by the oxalic acid anodic oxidation coating treatment, which is a low-cost treatment.

Further, according to the present invention, the annular space is formed by the distal end portion of an annular projection formed on the tubular portion and the inner peripheral surface of the distal end portion of an annular metal fitting which is separate from the valve body. To realize this arrangement, it is only necessary to form a projecting seal portion (knife edge) on the distal end of the tubular portion and to form the annular metal fitting into an annular member having a rectangular sectional configuration. Therefore, the annular space can be formed easily at reduced cost. Moreover, the annular projection can be produced at low cost by machining the distal end of the tubular portion, and the annular metal fitting functions as a rotary flange, which facilitates alignment of bolt holes.

BRIEF DESCRIPTION OF THE DRAWINGS

FIG. 2b is an enlarged view of a part II in FIG. 2a.

DESCRIPTION OF THE PREFERRED EMBODIMENTS

Figure 1:
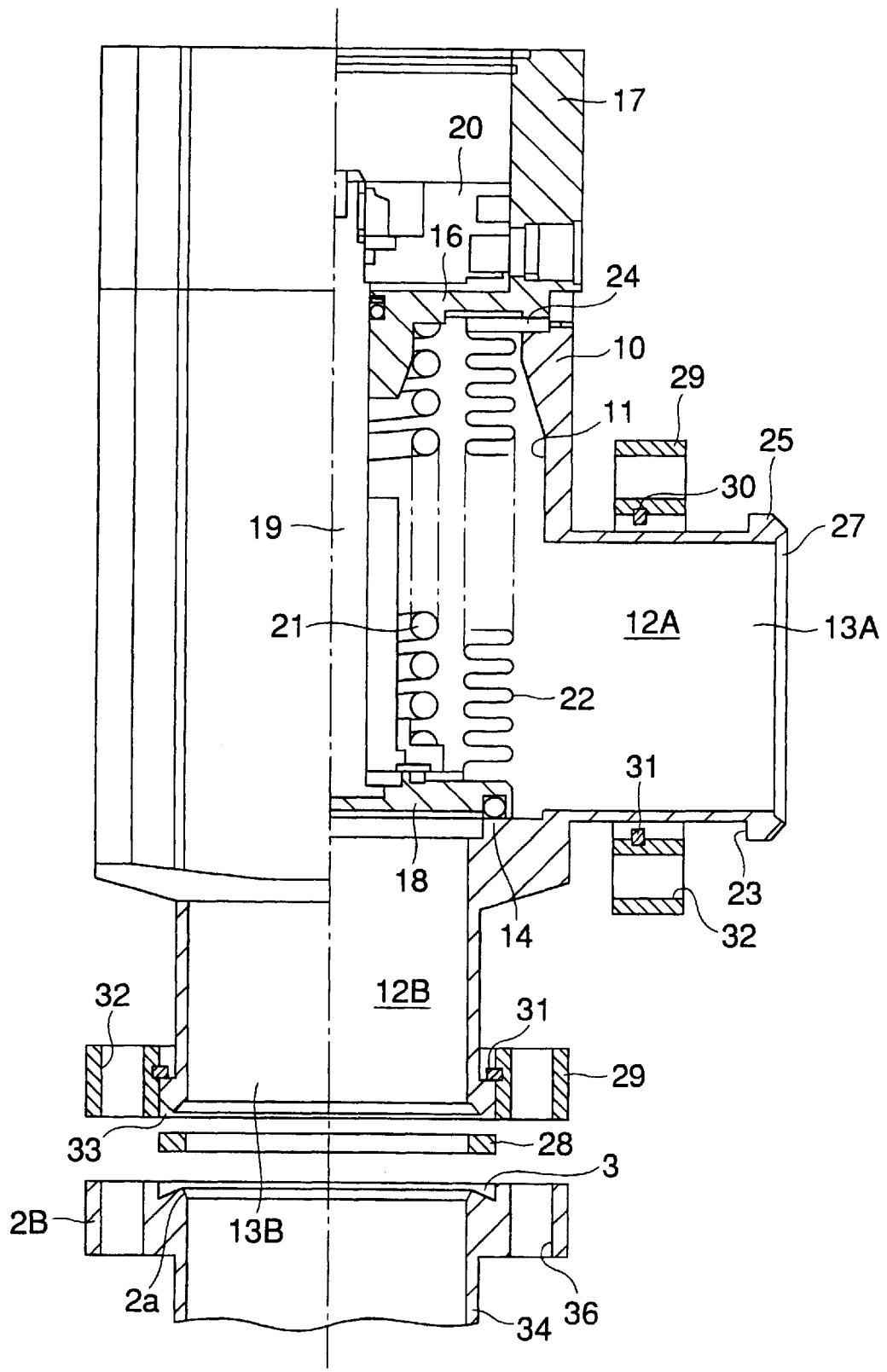
FIG. 1 is a vertical sectional view showing an embodiment of a high-vacuum valve according to the present invention.

FIG. 1 shows an embodiment of a high-vacuum valve according to the present invention. A valve body 10 has a valve chamber 11 formed therein. The valve chamber 11 has ports 13A and 13B formed by tubular portions 12A and 12B, respectively. The axis of the tubular portion 12A and the axis of the tubular portion 12B form approximately right angles with each other. The port 13A and the port 13B are communicated with each other through the valve chamber 11. A valve seat 14 is formed in a flow path connecting the valve chamber 11 and one tubular portion 12B. A valve element 18, together with a valve rod 19, is vertically movably disposed to face the valve seat 14, which is located at the lower end of the valve chamber 11. The flow path is closed by bringing the valve element 18 into contact with the valve seat 14. The flow path is opened by separating the valve element 18 from the valve seat 14. A cylinder 17 with a partition 16 is connected to the upper end of the valve chamber 11 of the valve body 10. A metal ring 24 is clamped between the valve body 10 and the cylinder 17. The valve rod 19 extends slidably and hermetically through a center hole of the partition 16. The upper end of the valve rod 19 is connected to a piston 20 slidably fitted in the cylinder 17. A spring 21 is loaded between the upper surface of the valve element 18 and the lower surface of the partition 16. A metallic bellows 22 covers both the valve rod 19 and the spring 21. The lower end of the bellows 22 is welded to an outer peripheral portion of the upper surface of the valve element 18. The upper end of the bellows 22 is welded to the inner peripheral portion of the metal ring 24.

An annular projection 25 is integrally formed on the outer periphery of the distal end portion of each of the tubular portions 12A and 12B. A seal portion at the distal end of the annular projection 25 is subjected to an oxalic acid anodic oxidation coating treatment (oxalic acid anodized aluminum coating treatment). As has been stated above, in the process of a sulfuric acid anodic oxidation coating treatment, a sulfuric acid anodic oxidation coating grows in the form of columns inwardly from the surface. In the case of the oxalic acid anodic oxidation coating treatment, however, it has become clear that ① a coating that grows inwardly from the surface is not in a completely columnar shape, and that ② the number of pores (tiny openings) formed in the oxalic acid anodic oxidation coating is 10% or less of that in the sulfuric acid anodic oxidation coating under particular conditions, and that ③ the distance between each pair of adjacent pores is relatively long and the number of crack starting points is relatively small under particular treatment conditions. Consequently, a hardness (Hv 400 to 500) necessary for the seal portion (knife edge 27) of the high-vacuum valve was obtained. As a result of a reduction in the number of defects in the anodic oxidation coating by current reversal, when the oxalic acid anodic oxidation coating is heated and baked, the temperature at which the coating is cracked is higher than in the case of the sulfuric acid anodic oxidation coating. Accordingly, even at 150° C., which is the upper limit of the actual working temperature range, the oxalic acid anodic oxidation coating endures 10 or more heat cycles and 20 or more attaching and detaching operations, and the slow leak is reduced to an extent which gives rise to no problem in practical use.

An annular flat ring seat 23 is formed on the rear side of the annular projection 25. The distal end of each of the tubular portions 12A and 12B is a seal portion with which a soft aluminum annular gasket 28 is brought into contact under pressure, and a knife edge 27 is formed on the distal end. An annular metal fitting 29 for a flange has an inner diameter larger than the outer diameter of the annular projection 25. The annular metal fitting 29 has an engagement groove 30 formed at a predetermined position on the inner periphery thereof. As shown in regard to the port 13A in FIG. 1, the annular metal fitting 29 is fitted by passing over the outside of the annular projection 25 and positioned outside the tubular portion 12A. A C-shaped retaining ring 31 is radially expanded and, in this state, it is fitted by passing over the outside of the annular projection 25. Then, the outer diameter of the C-shaped retaining ring 31 is reduced and, in this state, the retaining ring 31 is fitted into the engagement groove 30 on the inner periphery of the annular metal fitting 29. The annular metal fitting 29 is moved toward the distal end of the tubular portion 12A (12B). Then, as shown in regard to the port 13B in FIG. 1, the annular metal fitting 29 is movably fitted on the outer periphery of the annular projection 25, and a side of the C-shaped retaining ring 31 abuts on the annular projection 25. The C-shaped retaining ring 31 and the ring seat 23 restrict the movement of the annular metal fitting 29 toward the distal end of the tubular portion 12A (12B). The arrangement is so set that the distal end of the annular metal fitting 29 slightly projects forwardly from the distal end of the tubular portion 12A (12B). Thus, an annular space 33 for interposing an annular gasket 28 is formed by the inner peripheral surface of the distal end portion of the annular metal fitting 29 and the distal end portion of the tubular portions 12A (12B). The annular metal fitting 29 has bolt holes 32 formed therein. The annular metal fitting 29 performs the function of a rotary flange of the tubular portion 12A (12B).

In the case of the oxalic acid anodic oxidation coating, corrosion resistance to a 1% hydrochloric acid solution is about 10 times as high as that in the case of the sulfuric acid anodic oxidation coating. Therefore, the oxalic acid anodic oxidation coating may be applied not only to the seal portion at the distal end of each annular projection 25 but to the whole of the valve body 10. However, the rate of gas released from the oxalic acid anodic oxidation coating is ten or more times as high as that from the non-treated metal surface. Therefore, in a use application where the atmospheric pressure and a vacuum are repeated at all times, only the seal portions and the outer peripheral surface of the valve body 10 should preferably be subjected to the oxalic acid anodic oxidation coating treatment. It should be noted that the valve body 10 is produced from an extruded or forged aluminum alloy.

Figure 2A:
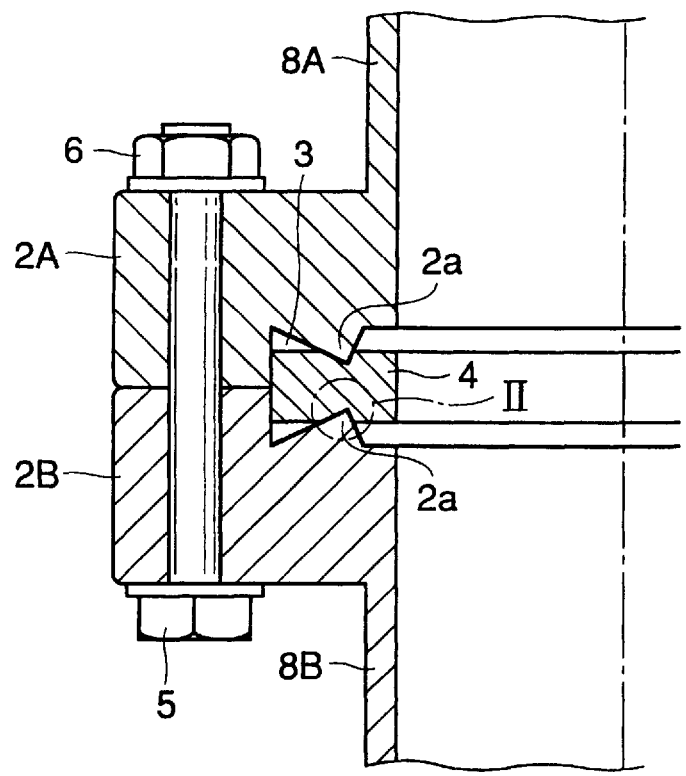
FIG. 2a is a vertical sectional view showing a conventional flange joint structure for high vacuum.
Figure 2B:
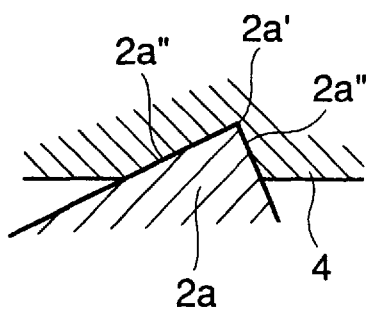

To connect a pipe 34 to the high-vacuum valve according to the embodiment of the present invention, the structure of the end portion of the pipe 34 is arranged as in the case of the flanges 2A and 2B shown in FIG. 2a, but may be arranged as in the case of the end portions of the tubular portions 12A and 12B of the high-vacuum valve. The annular gasket 28 is brought into contact with the inner wall (knife edge 27) of the annular space 33 on the high-vacuum valve side. Then, the inner wall (knife edge 2a) of the annular space 3 on the pipe side is brought into contact with the annular gasket 28. Next, the annular metal fitting 29 is rotated to align the bolt holes 32 of the annular metal fitting 29 with bolt holes 36 of the flange 2B of the pipe 34. The alignment is effected by rotating only the annular metal fitting 29 without rotating the pipe 34. Accordingly, the aligning operation can be performed speedily and easily. Bolts are inserted into the bolt holes 32 of the annular metal fitting 29 on the high-vacuum valve and the bolt holes 36 of the flange 2B of the pipe 34, which are aligned with the bolt holes 32, respectively, and nuts are engaged with the bolts, respectively, thereby connecting the annular metal fitting 29 on the high-vacuum valve and the flange 2B of the pipe 34. Thus, the annular gasket 28 is hermetically contacted by the knife edge 27 on the high-vacuum valve side and the knife edge 2a on the pipe side in the same way as in the case of the arrangement shown in FIG. 2a.

The diameter of each of the flanges 2A and 2B in FIG. 2a is considerably larger than the diameter of each of thin-walled pipes 8A and 8B; therefore, the flanges 2A and 2B are not formed by machining the thin-walled pipes 8A and 8B. To provide the flanges 2A and 2B, which are relatively large in both diameter and thickness, on the thin-walled pipes 8A and 8B, annular members which are separate from the pipes 8A and 8B must be connected to them by welding. In contrast, the annular projection 25 in FIG. 1 has a diameter approximately equal to that of the tubular portion 12A. Therefore, the annular projection 25 can be formed by machining the distal end portion of the tubular portion 12A. Further, the annular metal fitting 29 is allowed to function as a rotary flange by combining it with the annular projection 25. Accordingly, a rotary flange can be produced at lower cost than in the case of the conventional flange shown in FIG. 2a. Moreover, when compared to machining for forming the annular space 3 (recess) and the knife edge 2a in FIG. 2a, machining for forming only the knife edge 27 in FIG. 1 can be performed at reduced cost and for a short period of time because the number of portions to be machined is relatively small and the formation of the knife edge 27 requires only a simple machining process.

What is claimed is:

1. In a high-vacuum valve of the type wherein a plurality of ports are communicated with a valve chamber in a valve body through respective tubular portions, and a valve seat is formed in a flow path connecting said valve chamber and one of said tubular portions, and wherein said flow path is closed by bringing a valve element into contact with said valve seat, and said flow path is opened by separating said valve element from said valve seat, the improvement wherein an annular space for interposing a metallic annular gasket is formed at an end portion of a tubular portion of an aluminum alloy that forms a port, and a seal portion is formed on an inner wall that forms said annular space, and wherein said seal portion or a whole of said valve body is subjected to an oxalic acid anodic oxidation coating treatment, thereby enhancing compression strength of said seal portion and preventing said seal portion from being damaged, deformed and sticking to said metallic annular gasket.

2. A high-vacuum valve according to claim 1, wherein an annular projection is formed on an outer periphery of the end portion of said tubular portion, and an annular metal fitting is movably fitted on an outer peripheral surface of said annular projection, and wherein a C-shaped retaining ring fitted in an engagement groove on an inner periphery of said annular metal fitting is disposed to abut on a ring seat provided on a rear side of said annular projection, and said annular space is formed by an inner peripheral surface of a distal end portion of said annular metal fitting and the end portion of said tubular portion, and wherein said metallic annular gasket is made of a soft aluminum material, and said seal portion has a knife edge.

* * * * *